Figure 1:
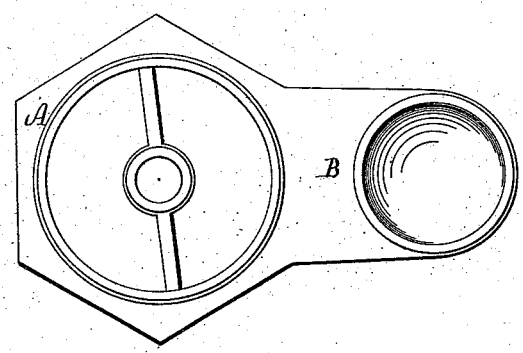
Figure 2:
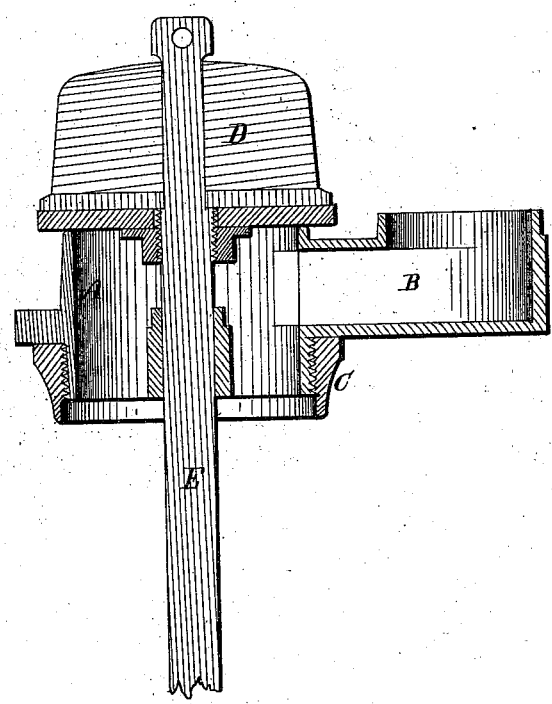

E. MILLS.
Water-Closet Valves.

No. 158,646.  Patented Jan. 12, 1875.

WITNESSES.
George H. Haynes.
Ch. Haughton

INVENTOR.
Edwin Mills.

UNITED STATES PATENT OFFICE.

EDWIN MILLS, OF SOMERVILLE, MASSACHUSETTS.

IMPROVEMENT IN WATER-CLOSET VALVES.

Specification forming part of Letters Patent No. 158,646, dated January 12, 1875; application filed August 17, 1874.

*To all whom it may concern:*

Be it known that I, EDWIN MILLS, of Somerville, in the county of Middlesex and Commonwealth of Massachusetts, have invented a new and useful Improvement in Valves for Water-Closets, of which the following, taken in connection with the annexed drawings, is a full, clear, and exact description.

Water for clearing the bowl in a water-closet is usually drawn from an elevated tank. In or under the bottom of the main tank there is placed a small supplementary tank or vessel calculated to contain water enough to wash out the bowl below. Upon raising the valve cover or stopper, marked in the drawing D, water flows from the main tank through the valve into the supplementary tank or vessel upon which the valve is placed, and the pipe conducting it to the bowl. The handle being released, the valve cover or stopper D closes, and unless air is admitted to the supplementary tank or vessel below the valve cover or stopper D, the water in the supplementary tank is suspended and cannot flow through the conducting-pipe to the bowl below.

Heretofore, the admission of air to the supplementary tank or vessel, so that the water in it might flow to the bowl, has been effected by soldering a pipe into it to extend above the water-level in the main tank. The supplementary tank being generally placed below the bottom of the main tank, to enable it to take water as long as any remained in the main tank, the air-pipe had not only to be soldered into the supplementary pipe, but also carried through and soldered into the bottom of the main tank, which is a difficult job to make securely tight, and therefore quite costly when the work is made perfect as it ought to be.

The object of the invention is to provide a more convenient and cheap method of connecting the air-pipe with the supplementary tank or vessel in or below the bottom of the main tank.

In the drawing, A is the cylinder or body of the valve; B, a hollow boss or projection on one side of A. C is a collar screwed to the bottom of A to connect the valve to the supplementary tank or vessel under it. D is the valve cover or stopper, weighted in the usual manner, and E is the guide rod or stem of the valve cover or stopper. The hollow boss B has a teat with an opening upward, into which the air-pipe is inserted either with a screw or ground joint, or by soldering. A piece of brass or other rigid metal pipe, ground in to make a tight fit, so that it may be lifted out and replaced at pleasure, is most desirable.

This pipe, when carried just above the surface of the water in the main tank, may also serve as an overflow or waste-water pipe.

I claim as new—

In a water-closet valve, the hollow boss or projection B, with the teat opening upward to receive the air-pipe, substantially as described.

EDWIN MILLS.

Witnesses:
 GEORGE A. HAYNES,
 CHAS. HOUGHTON.